United States Patent
Sunaga et al.

(10) Patent No.: US 7,023,152 B2
(45) Date of Patent: Apr. 4, 2006

(54) DRIVING CONTROL DEVICE FOR ACTUATOR

(75) Inventors: Hideki Sunaga, Tokyo (JP); Kaoru Tanaka, Tokyo (JP); Futoshi Araki, Tokyo (JP); Eiji Takahashi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/743,540

(22) Filed: Dec. 23, 2003

(65) Prior Publication Data

US 2004/0189225 A1 Sep. 30, 2004

(30) Foreign Application Priority Data

Dec. 27, 2002 (JP) ............................. 2002-380562

(51) Int. Cl.
*H02P 1/04* (2006.01)
*H02P 1/16* (2006.01)

(52) U.S. Cl. ........................... 318/34; 318/62; 318/63; 318/59; 318/60; 318/54; 318/55; 318/56; 318/599; 318/801

(58) Field of Classification Search .................. 318/10, 318/280, 375, 376, 599, 811, 254, 34, 59–60, 318/54–56

See application file for complete search history.

(56) References Cited

U.S. PATENT DOCUMENTS

| | | | |
|---|---|---|---|
| 4,724,372 A * | 2/1988 | Takeuchi et al. | 318/685 |
| 4,823,056 A * | 4/1989 | Watanabe et al. | 388/829 |
| 4,972,133 A * | 11/1990 | Hirota et al. | 318/646 |
| 5,281,902 A * | 1/1994 | Edelen et al. | 318/632 |
| 5,369,349 A * | 11/1994 | Tsuchiya et al. | 318/811 |
| 5,469,840 A * | 11/1995 | Tanii et al. | 600/117 |
| 5,552,683 A * | 9/1996 | Dargent | 318/287 |
| 5,589,805 A * | 12/1996 | Zuraski et al. | 332/109 |
| 5,600,634 A * | 2/1997 | Satoh et al. | 370/294 |
| 5,737,203 A * | 4/1998 | Barrett | 363/75 |
| 5,838,124 A * | 11/1998 | Hill | 318/269 |
| 5,847,521 A * | 12/1998 | Morikawa et al. | 318/254 |
| 5,880,565 A * | 3/1999 | Watanabe | 318/139 |
| 5,884,237 A * | 3/1999 | Kanki et al. | 702/113 |
| 5,886,504 A * | 3/1999 | Scott et al. | 322/15 |
| 6,005,316 A * | 12/1999 | Harris | 310/90.5 |
| 6,013,994 A * | 1/2000 | Endo et al. | 318/432 |
| 6,018,200 A * | 1/2000 | Anderson et al. | 290/40 B |
| 6,067,490 A * | 5/2000 | Ichimaru et al. | 701/37 |
| 6,072,292 A * | 6/2000 | Uchiyama et al. | 318/376 |
| 6,078,154 A * | 6/2000 | Manlove et al. | 318/293 |
| 6,118,186 A * | 9/2000 | Scott et al. | 290/40 B |

(Continued)

FOREIGN PATENT DOCUMENTS

JP 3199722 B2 8/2001

*Primary Examiner*—David Martin
*Assistant Examiner*—Elias Hiruy
(74) *Attorney, Agent, or Firm*—Foley & Lardner LLP

(57) ABSTRACT

A driving control device for an actuator comprises a driving device to drive an actuator having an electric motor (30) and a driving control device (50) to control the rotation of the electric motor (30) by controlling the driving device. The driving control device includes an H bridge circuit constructed by four switching semiconductor elements (Tr1 to Tr4), and rotates the electric motor in normal and reverse directions by turning on and turning off the switching semiconductor elements (Tr1 to Tr4). The driving control device (50) conducts to activate and to stop the electric motor (30) by applying a PWM signal to the switching semiconductor elements (Tr3 and Tr4) constructing the lower arm of the H bridge circuit (51).

21 Claims, 6 Drawing Sheets

U.S. PATENT DOCUMENTS

| | | | |
|---|---|---|---|
| 6,124,688 A * | 9/2000 | Coles et al. | 318/254 |
| 6,175,272 B1 * | 1/2001 | Takita | 330/10 |
| 6,204,729 B1 * | 3/2001 | Takita | 330/146 |
| 6,208,102 B1 * | 3/2001 | Kikuchi et al. | 318/466 |
| 6,260,644 B1 * | 7/2001 | Otsu | 180/65.3 |
| 6,285,154 B1 * | 9/2001 | Yasuda et al. | 318/685 |
| 6,288,508 B1 * | 9/2001 | Taketomi et al. | 318/376 |
| 6,291,960 B1 * | 9/2001 | Crombez | 318/599 |
| 6,324,908 B1 * | 12/2001 | Colarelli et al. | 73/462 |
| 6,335,599 B1 * | 1/2002 | Nonaka et al. | 318/430 |
| 6,366,038 B1 * | 4/2002 | Bohm | 318/254 |
| 6,401,891 B1 * | 6/2002 | Saito et al. | 191/2 |
| 6,435,027 B1 * | 8/2002 | Colarelli et al. | 73/462 |
| 6,496,340 B1 * | 12/2002 | Hornberger et al. | 361/51 |
| 6,611,117 B1 * | 8/2003 | Hardt | 318/254 |
| 2001/0052814 A1 * | 12/2001 | Takita | 330/10 |
| 2002/0030457 A1 * | 3/2002 | Bastholm et al. | 318/434 |
| 2002/0051368 A1 * | 5/2002 | Ulinski et al. | 363/1 |
| 2002/0064756 A1 * | 5/2002 | Pagnini et al. | 433/102 |
| 2002/0124580 A1 * | 9/2002 | Suitou et al. | 62/133 |
| 2003/0175124 A1 * | 9/2003 | Hahn et al. | 417/44.1 |
| 2004/0135528 A1 * | 7/2004 | Yasohara et al. | 318/254 |
| 2004/0240540 A1 * | 12/2004 | Matsushima | 375/238 |
| 2004/0244771 A1 * | 12/2004 | Hoshino et al. | 123/350 |
| 2005/0120492 A1 * | 6/2005 | Koo et al. | 8/159 |

* cited by examiner

DRIVING CONTROL DEVICE FOR ACTUATOR

BACKGROUND OF THE INVENTION

1. Field of the Invention

The present invention relates to a driving control device for an actuator which controls the driving of the actuator for opening and closing an air mix door of an air conditioning device for a vehicle, for example.

2. Description of the Prior Art

Conventionally, there has been known a driving control device for an actuator which controls the driving of the actuator for opening and closing an intake door.

This type of actuator driving control device comprises a driving circuit for driving a DC electric motor and a driving control circuit for controlling the rotation of the electric motor by controlling the driving circuit.

The driving control circuit compares a detected signal of a detecting device which detects the rotation position of the intake door and a targeted value, and controls the driving circuit so as to position the intake door in a targeted position.

The driving circuit of the actuator driving control device is composed of an H bridge circuit 100 for rotating the DC electric motor in normal and reverse directions. The H bridge circuit 100 is composed of four MOS type transistors Tr1 to Tr4, as shown in FIG. 6, for example.

In the H bridge circuit, it has been known that at least two transistors of the four transistors are driven by PWM control (for example, reference to Japanese Patent 3199722).

However, in this actuator driving control device, when the motor is actuated (or is stopped), the output of the electric motor is rapidly changed by turning on (and/or turning off) the MOS transistors, Tr1 to Tr4, of the H bridge circuit 100. Consequently, there has been a problem that noise is generated by backlash of a gear, and the noise is offensive to ears, because especially in recent years, a sound of an engine has been reduced, and an interior of a car has become increasingly noiseless.

SUMMARY OF THE INVENTION

It is, therefore, an object of the present invention to provide a driving control device for an actuator capable of preventing a generation of noise when an electric motor is actuated or is stopped.

In order to achieve above object, a driving control device for an actuator according to the present invention comprises a driving circuit to drive an actuator having an electric motor and a driving control circuit to control the rotation of the electric motor by controlling the driving circuit, and the driving circuit comprises an H bridge circuit constructed by a switching semiconductor element, and rotates the electric motor in normal and reverse directions by turning on and/or off the switching semiconductor element.

The driving control device conducts activating and/or stopping the electric motor by applying a PWM signal to the switching element constructing the lower arm of the H bridge circuit, and regenerative braking is applied to the electric motor by applying the PWM signal to the switching semiconductor element constructing the lower arm.

The driving control device may be constructed to be capable of selecting a mode for applying the PWM signal to the switching semiconductor element constructing the lower arm or a mode for applying the driving pulse.

The driving control device may comprise a function for switching to apply the driving pulse when a radio is turned on and to apply the PWM signal when the radio is turned off.

Moreover, the driving control device can comprise a construction for switching the mode to the mode for applying the driving pulse when a targeted torque is not obtained even if the PWM signal is applied.

DETAILED DESCRIPTION OF THE PREFERRED EMBODIMENTS

Hereinafter, an embodiment of an air conditioning device for a vehicle to which a driving control device for an actuator according to the present invention is applied will be described with reference to the accompanying drawings.

Figure 1:
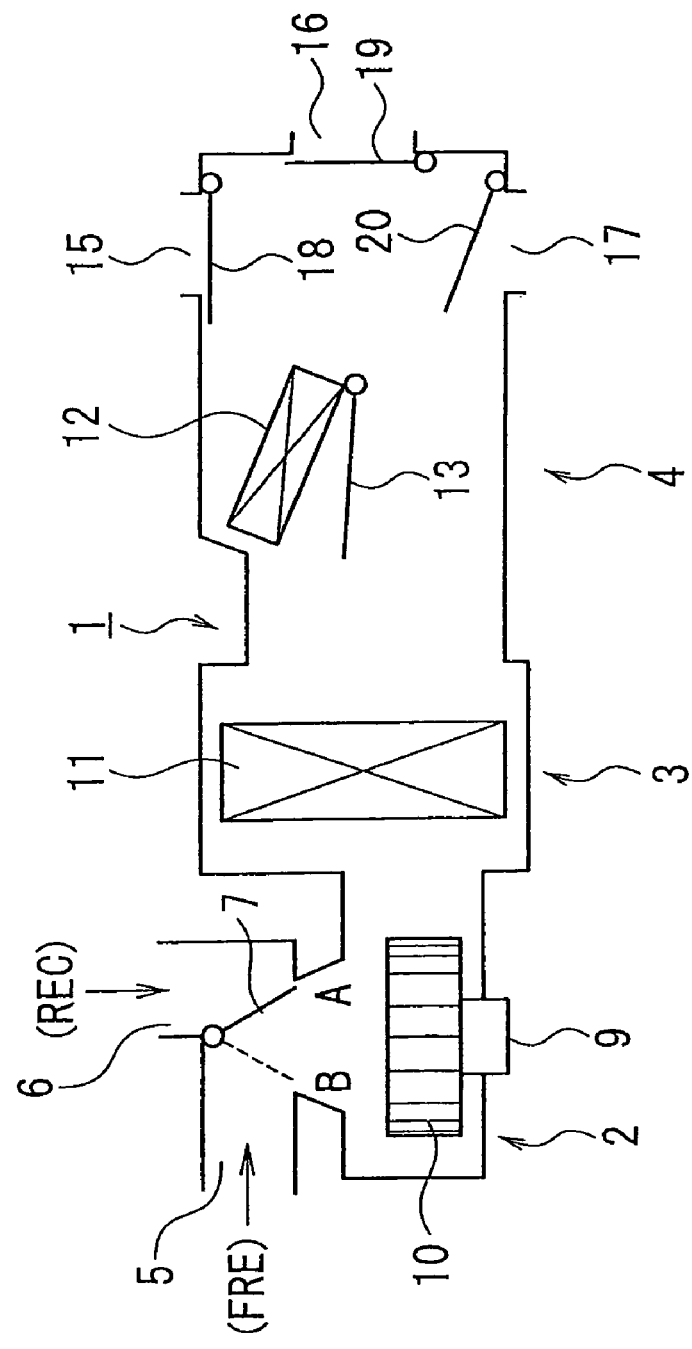
FIG. 1 is a schematic view showing a construction of an air conditioning device for a vehicle in which a driving control device of an electric motor type actuator according to the present invention is applied.

In FIG. 1, reference numeral 1 denotes a body of air conditioning device for a vehicle. As well as a general air conditioning device for a vehicle, the body 1 is constructed by an intake unit 2 for selectively taking in outside air or inside air, a cooling unit 3 for cooling the intake air, and a heater unit 4 for blowing out the blended air in a vehicle after the intake air is blended and the temperature of the intake air is adjusted.

The intake unit 2 is provided with an outside air intake 5 for taking in outside air and an inside air intake 6 for taking in inside air. The connection portion of the intakes 5 and 6 is provided with a rotatable intake door (driven mechanism) 7 for adjusting the ratios of the outside air and the inside air which are taken in the unit. The intake door 7 is rotated by an electric motor type actuator (not shown).

The intake door 7 is rotated by transmitting the rotation of an actuator lever 30L to the intake door 7 shown in FIG. 1 through a link mechanism (not shown). The rotation position of the intake door 7 is detected by a potentiometer 31 as described below.

As shown in FIG. 1, the intake unit 2 comprises fan 10 which is rotated at a predetermined speed by a fan motor 9. Each outside air or inside air is selectively taken from the outside air intake 5 or the inside air intake 6 by the rotation of the fan 10, and in accordance with the position of the intake door 7. Moreover, the rotation speed of the fan 10 is changed by modulation of an applied voltage to the fan motor 9, so that the volume of air to be blown inside a vehicle is adjusted. When the intake door 7 is positioned in A as shown in FIG. 1, an outside air entry (FRE) is adopted, and when the intake door 7 is positioned in B as shown in FIG. 1, an inside air circulation (REC) is adopted.

An evaporator 11 for constructing a refrigeration cycle is installed in the cooling unit 3. Refrigerant is supplied to the evaporator 11 by activating a compressor (not shown), and the intake air is cooled down by a heat exchange with the refrigerant.

A heat core 12 for circulating engine cooling water is installed in the heater unit 4. An air mix door 13 for adjusting the ratio between the volume of air which is passed through the heat core 12 and the volume of air which bypasses the heat core 12 is rotatably disposed in the upstream side of the heat core 12.

Figure 2:
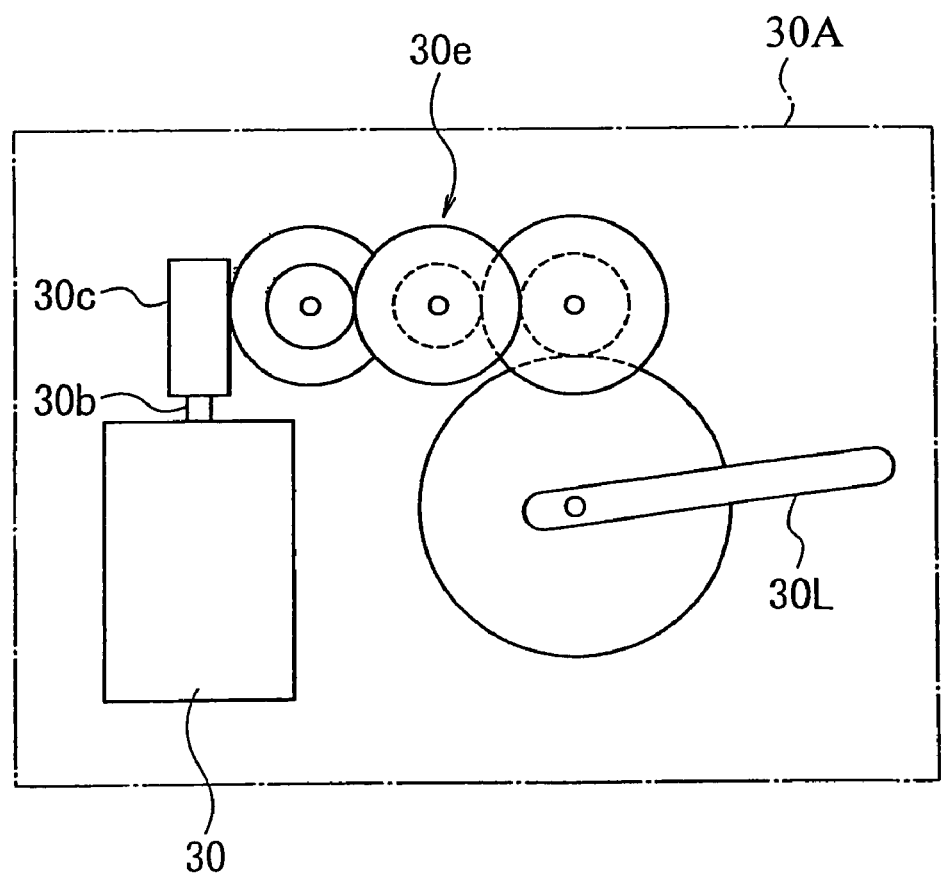
FIG. 2 is a view showing an example of the electric motor type actuator according to the present invention.

The air mix door 13 is rotated by an electric motor type actuator 30A shown in FIG. 2 through a link mechanism (not shown). A mixture ratio between the warm air which is heated by the heat exchange with the engine cooling water after passing through the heat core 12 and unheated cool air which is bypassed the heat core 12 is changed, so that the temperature of the air which is blown inside the vehicle is adjusted.

The adjusted air is supplied inside the vehicle from any blower of a defrost blower 15, a vent blower 16, and a foot blower 17. These blowers 15 to 17 are respectively provided with a defrost door 18, a vent door 19, and a foot door 20 rotatably.

These doors 18 to 20 are rotated by an electric motor type actuator (not shown) through a link mechanism (not shown). A blowing mode is arbitrarily set up by combining an opening and closing condition of each blower 15 to 17.

FIG. 2 is a view showing an example of an electric motor type actuator according to the present invention. The electric motor type actuator 30A comprises an electric motor 30, a worm 30c installed in a power output shaft 30b of the electric motor 30, a reduction gear train mechanism 30e which is engaged with the worm 30c, and the actuator lever 30L which is rotated through the worm 30c and the reduction gear train mechanism 30e.

Figure 3:
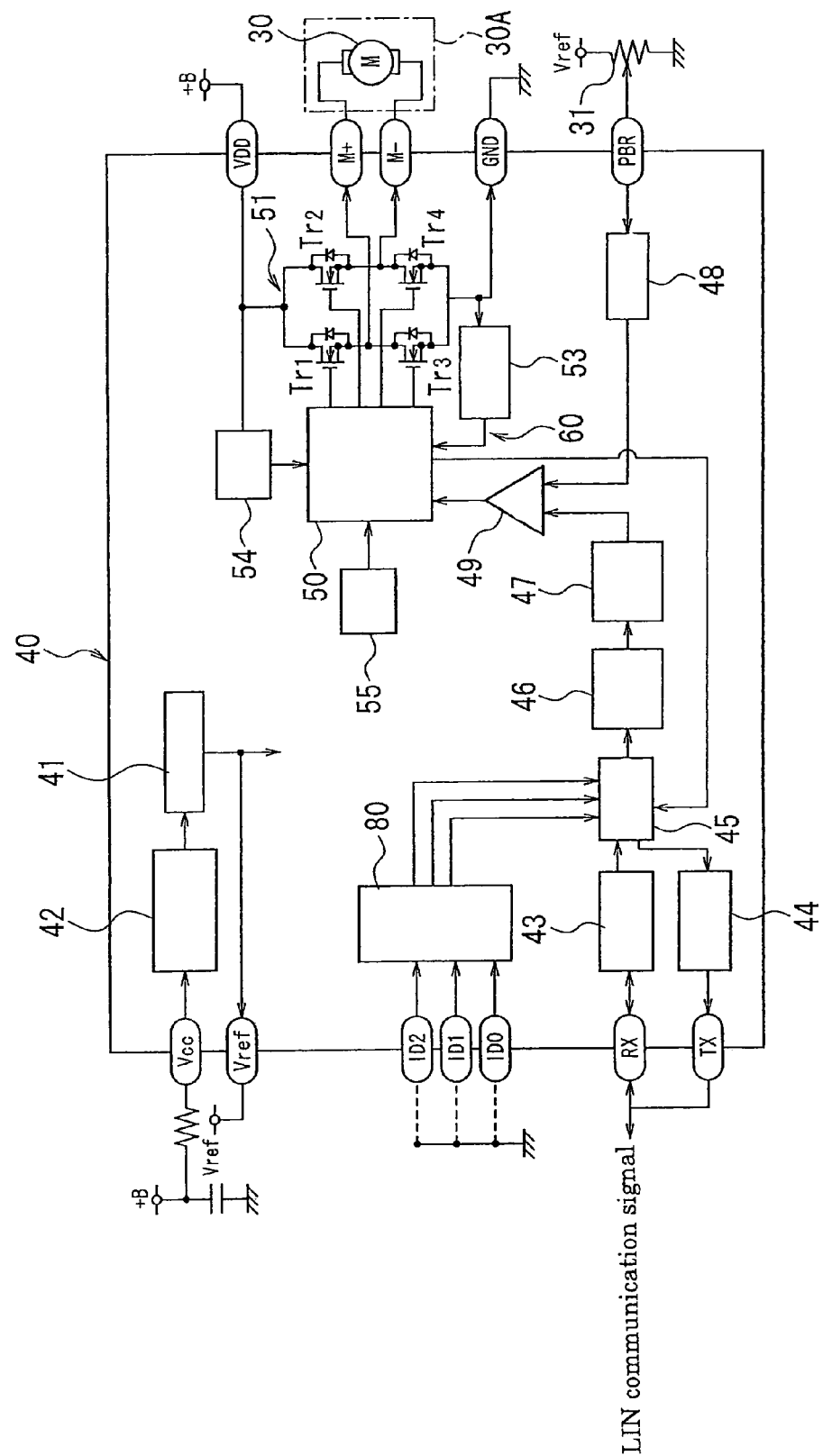
FIG. 3 is a block diagram of the driving control device of the electric motor type actuator.

FIG. 3 is a block diagram showing the construction of a control unit (a driving control device for an actuator) 40 which controls the actuator 30A and the like.

The control unit 40 is provided with a power source circuit of 5V 41, a circuit for protecting an internal power source 42, a first LIN input circuit 43, a second LIN output circuit 44 a communication ID input setup circuit 80, and a LIN communication processing circuit 45.

The power source circuit of 5V 41 generates 5V power source by receiving the electric power from a power source of battery +B. The internal power source protecting circuit 42 protects the 5V power source circuit 41. The first LIN input circuit receives data from a main control unit (not shown). The second LIN output circuit sends data to the main control unit (not shown). The communication ID input setup circuit 80 sets up an ID cord for identifying each control unit 40. The LIN communication processing circuit 45 extracts data having the same ID cord with the ID cord which is set up by the communication ID input setup circuit 80 from the data received by the LIN input circuit 43. The LIN communication processing circuit 45 adds the ID cord set up by the ID input setup circuit 80 to required data, and then sends the data to the LIN output circuit 44. At this point, the LIN communication processing is a communication in line with ISO9141 standard, and its communication method is UART.

Furthermore, the control unit 40 comprises a data latch circuit 46, a D/A converter 47, an input circuit 48, a comparator 49, and an actuator driving output control circuit (driving control device) 50, and an H bridge circuit (driving device) 51.

The data latch circuit 46 maintains the data extracted by the LIN communication processing circuit 45. The D/A converter 47 conducts D/A conversion for the data maintained by the data latch circuit 46. The input circuit 48 inputs the output voltage of the potentiometer 31 which detects an opening of the intake door 7. The comparator 49 compares the output voltage of the potentiometer 31 which is supplied through the input circuit 48 and the voltage which is output from the D/A converter 47, and then outputs an output signal in accordance with the difference of those voltages. The actuator driving output control circuit 50 generates PWM signal, which controls the electric motor, based on the output signal of the comparator 49, and outputs the PWM signal. The H bridge circuit 51 drives the electric motor 30 based on the PWM signal which is output from the actuator driving output control circuit 50.

The control unit 40 is also provided with an over-current detection circuit 53, an over-voltage detection circuit 54, and an over-temperature detection circuit 55. The over-current detection circuit 53 generates an over-current detection output when the current supplied to the electric motor 30 through the H bridge circuit 51 exceeds a predetermined acceptable value. The over-voltage detection circuit 54 generates an over-current detection output when the voltage (voltage of power source of battery +B) applied to the electric motor 30 exceeds a predetermined acceptable value. The over-temperature detection circuit 55 observes a temperature of the electric motor 30 based on a detected output of a temperature detection element (not shown) such as a thermistor installed in the electric motor 30, and generates an over-temperature detection output when a temperature of the electric motor 30 exceeds a predetermined acceptable temperature.

When the over-current, the over-voltage, and the over-temperature are detected by these detection circuits 53, 54, and 55, the H bridge circuit 51 and the electric motor 30 are adopted to be protected by stopping the driving of the electric motor 30.

Figure 4:
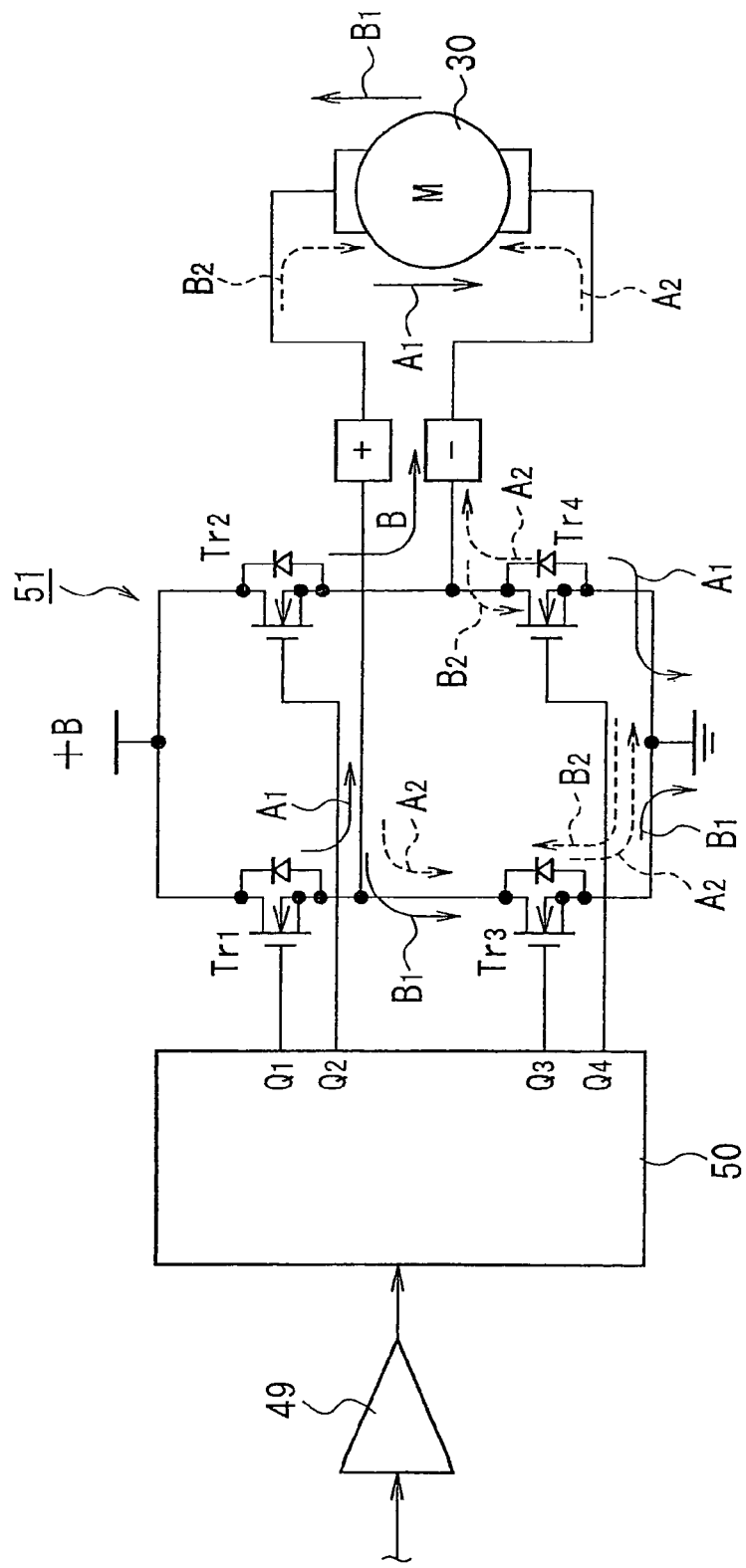
FIG. 4 is a circuit diagram showing an enlarged H bridge circuit and an enlarged actuator driving control circuit according to the present invention.

FIG. 4 is a partly enlarged view of the H bridge circuit and the actuator driving control circuit. The H bridge circuit 51 is constructed by first and second transistors, Tr1 and Tr2, which construct an upper arm, a transistor Tr3 which constructs one of the lower arms, and a transistor Tr4 which constructs the other lower arm.

The actuator driving output control circuit 50 judges about whether or not the driving of the electric motor 30 is required based on the output voltage of the comparator 49. In other words, when the output voltage of the comparator 49 is higher than a reference voltage by a predetermined value, the actuator driving output control circuit 50 determines that the door should be driven in an opening direction by normally driving the electric motor 30. When the output voltage of the comparator 49 is lower than the reference voltage by a predetermined value, the actuator driving output control circuit 50 determines that the door should be driven in a closing direction by reversely driving the electric motor 30. When the output voltage of the comparator 49 is within a predetermined value range with respect to the reference voltage, the actuator driving output control circuit 50 determines that the electric motor 30 should be stopped.

Figure 5:
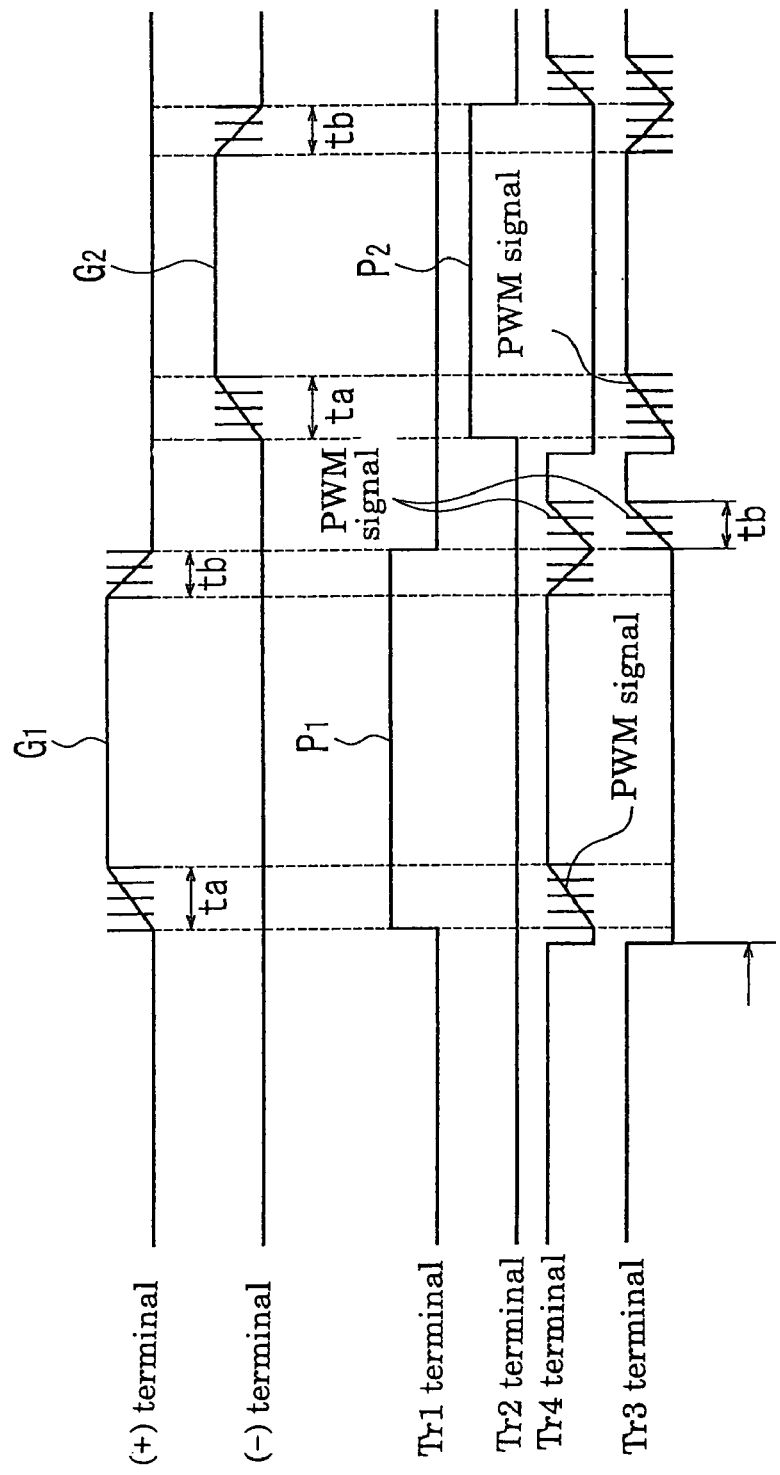
FIG. 5 is a timing chart describing soft start and soft stop of an electric motor.
Figure 6:
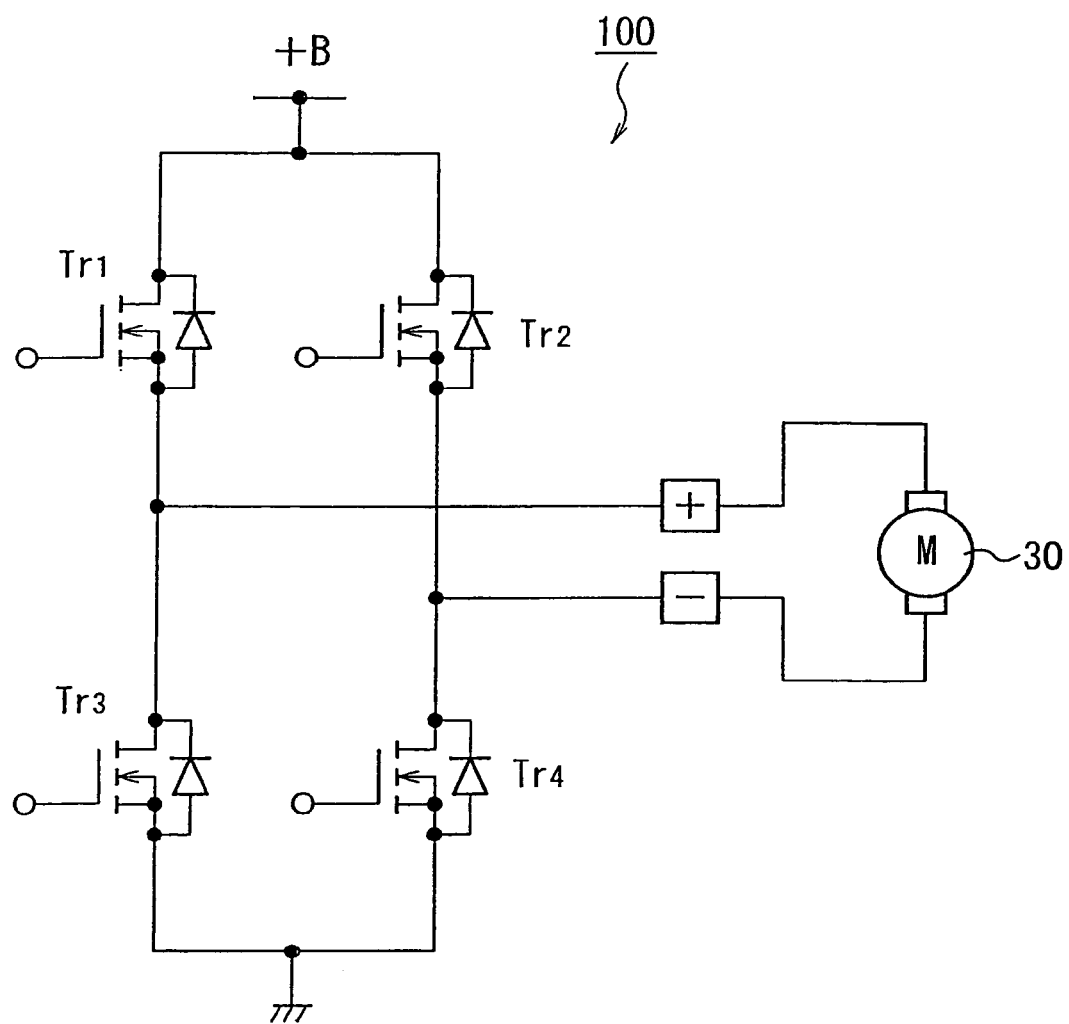
FIG. 6 is a circuit diagram showing an example of conventional H bridge circuit.

While the driving of the electric motor 30 is stopped, the actuator driving output control circuit 50 outputs a driving pulse to the transistors Tr3 and Tr4 such that the transistor Tr3 is turned on, and the transistor Tr4 is turned on. In FIG. 5, a reference numeral "t" denotes a zone that the driving pulse is input in the transistors Tr3 and Tr4.

As shown in FIG. 5, when the electric motor 30 is driven in the forward direction, a driving pulse P1 is output from a driving signal output terminal Q1 to the transistor Tr1, and the transistors Tr4 and Tr3 are turned off once. Next, PWM signal is output from a driving signal output terminal Q4 to the transistor Tr4. The PWM signal is controlled such that a duty ratio of the PWM signal is increased by 8% per second during the time ta from 0% to 100% adopting a targeted value of rotation frequency as 100%.

When the transistor Tr4 is turned on, an electric current shown in arrow A1 of FIG. 4 is flowed into the electric motor 30, and the rotation frequency of the electric motor 30 is gradually increased during the time ta, after that the electric motor 30 is rotated by a constant rotation frequency.

Next, when the actuator driving output control circuit 50 determines that the electric motor 30 should be stopped, PWM signal in which a duty ratio is decreased from 100% to 0% by 8% per second is output from the driving signal output terminal Q4 to the transistor Tr4 during time tb. The rotation frequency of th electric motor 30 is thereby decreased. At this point, the electric current flowed into the positive terminal of the electric motor 30 becomes a reference numeral G1 of FIG. 5.

While the actuator driving output control circuit 50 turns off the transistor Tr1 for softly applying a regeneration brake to the electric motor 30, the actuator driving outputs control circuit 50 outputs the PWM signal in which the duty ratio is increased from 0% to 100% from the driving signal output terminals Q3 and Q4 to the transistors Tr3 and Tr4 during the time tb. The electric current in the direction of arrow A2 is thereby flowed into the electric motor 30 based on an electromotive force accompanying the inertia rotation of the electric motor 30, and the regeneration brake is softly applied to the electric motor 30, and then the rotation of the electric motor is stopped.

As shown in FIG. 5, when the electric motor 30 is driven in the reverse direction, a driving pulse P2 is output from the driving signal output terminal Q2 to the transistor Tr2, and the transistors Tr3 and Tr4 are turned off once. Next, PWM signal is output from the driving signal output terminal Q3 to the transistor Tr3. The PWM signal is controlled such that the duty ratio of PWM signal is increased by 8% per second during the time ta from 0% to 100% adopting a targeted value of revolution frequency as 100%.

When the transistor Tr3 is turned on, an electric current shown in arrow B1 is flowed into the electric motor 30, and the rotation frequency of the electric motor 30 is gradually increased during the time ta. After that the electric motor 30 is rotated in the reverse direction at a constant rotation frequency.

Next, when the actuator driving output control circuit 50 determines that the electric motor 30 should be stopped, the PWM signal in which the duty ratio is decreased from 100% to 0% by 8% per second is output from the driving signal output terminal Q3 to the transistor Tr3 during the time tb. The rotation frequency of the electric motor 30 is thereby decreased. At this point, the electric current flowed into the negative terminal of the electric motor 30 becomes a reference numeral G2 of FIG. 5.

While the actuator driving output control circuit 50 turns off the transistor Tr2 for softly applying a regeneration brake to the electric motor 30, the actuator driving output control circuit 50 outputs the PWM signal in which the duty ratio is increased from 0% to 100% from the driving signal output terminals Q3 and Q4 to the transistors Tr3 and Tr4 during the time tb.

Consequently, the electric current in the direction of the arrow B2 in FIG. 4 is flowed into the electric motor 30 based on an electromotive force accompanying the inertia rotation of the electric motor 30, and the regeneration brake is softly applied to the electric motor 30, and then the rotation of the electric motor is stopped.

In this embodiment of the present invention, when the electric motor is activated, the rotation frequency of the electric motor 30 is adopted to increase from 0% to 100%, and when the electric motor is stopped, the rotation frequency of the electric motor 30 is adopted to decrease from 100% to 0%, so that the noise caused by backlash of a gear is reduced by using the PWM signal.

However, when avoiding a generation of radio noise caused by the PWM signal rather than reducing the noise caused by backlash of a gear, a bit for controlling ON/OFF of the PWM signal (turning on and turning off of the PWM signal) is provided in the LIN communication signal, and the actuator driving output control circuit 50 may determine the ON/OFF of the PWM signal. With the above described construction, when the PWM signal is ON, the actuator driving output control circuit 50 adopts a mode for applying the PWM signal, and when the PWM signal is OFF, the actuator driving output control circuit 50 adopts a mode for applying a driving pulse in which the transistors Tr3 and Tr4 are turned on and are turned off without being late.

The actuator driving output control circuit 50 may comprise a function for switching to apply the driving pulse when a radio is turned on and to apply the PWM signal when the radio is turned off.

The actuator driving output control circuit 50 may comprise a function for switching the mode to the mode for applying the driving pulse when a targeted torque cannot be obtained even if the PWM signal is applied.

As described above, according to the present invention, an electric motor can be started softly and can be stopped softly, so that when the electric motor is activated or is stopped, the noise generated by a power transmission mechanism such as a reduction mechanism or a driven mechanism such as an opening and closing mechanism can be reduced without changing a circuit construction drastically.

This application claims priority from Japanese Patent Application 2002-380562, filed Dec. 27, 2002, which is incorporated herein by reference in its entirety.

What is claimed is:

1. A driving control device for an actuator comprising:
a drive circuit configured to drive an electric motor of an actuator for opening and closing an air conditioning door; and
a drive control circuit configured to control a rotation of said electric motor by controlling the drive circuit,
wherein said drive circuit includes an H bridge circuit having a switching semiconductor element,
wherein said drive circuit is configured to rotate said electric motor in forward and reverse directions by turning on and/or off said switching semiconductor element,
wherein said drive control circuit is configured to start and/or stop said electric motor by applying a PWM signal to the switching semiconductor element constructing a lower arm of said H bridge circuit,
wherein said drive control circuit is capable of selecting a first mode for applying the PWM signal, or a second mode for applying a driving pulse, to the switching semiconductor element constructing said lower arm,
wherein said drive control circuit is communicatedly connected to a radio, and wherein said drive control circuit is configured to apply the driving pulse when said radio is turned on and is configured to apply the PWM signal when said radio is turned off.

2. The actuator driving control device according to claim 1, wherein, when starting the electric motor, said drive control circuit is configured to apply the PWM signal to the switching semiconductor element constructing the lower arm of said H bridge circuit such that a duty ratio of the PWM signal increases based on a first predetermined rate.

3. The actuator driving control device according to claim 2, wherein, when stopping the electric motor, said drive control circuit is configured to apply the PWM signal to the switching semiconductor element constructing the lower arm of said H bridge circuit such that duty ratio of the PWM signal decreases based on a second predetermined rate.

4. A driving control device for an actuator comprising:
a drive circuit configured to drive an electric motor of an actuator for opening and closing an air conditioning door; and
a drive control circuit configured to control a rotation of said electric motor by controlling the drive circuit,
wherein said drive circuit includes an H bridge circuit having a switching semiconductor element,
wherein said drive circuit is configured to rotate said electric motor in forward and reverse directions by turning on and/or off said switching semiconductor element,
wherein said drive control circuit is configured to start and/or stop said electric motor by applying a PWM signal to the switching semiconductor element constructing a lower arm of said H bridge circuit,
wherein, when starting the electric motor, said drive control circuit is configured to apply the PWM signal to the switching semiconductor element constructing the lower arm of said H bridge circuit such that a duty ratio of the PWM signal increases based on a first predetermined rate,
wherein, when stopping the electric motor, said drive control circuit is configured to apply the PWM signal to the switching semiconductor element constructing the lower arm of said H bridge circuit such that duty ratio of the PWM signal decreases based on a second predetermined rate, and
wherein the first and second predetermined rates are substantially equal.

5. The actuator driving control device according to claim 4, wherein a regenerative braking is applied to said electric motor by applying said PWM signal to the switching semiconductor element constructing said lower arm.

6. The actuator driving control device according to claim 4, wherein said drive control circuit is capable of selecting a first mode for applying the PWM signal, or a second mode for applying a driving pulse, to the switching semiconductor element constructing said lower arm.

7. The actuator driving control device according to claim 6, wherein said drive control circuit is configured to switch to the mode for applying the driving pulse when a targeted torque of the motor is not obtained even if the PWM signal is applied.

8. A driving control device for an actuator comprising:
a drive circuit configured to drive an electric motor of an actuator; and
a drive control circuit configured to control a rotation of said electric motor by controlling the drive circuit,
wherein said drive circuit includes an H bridge circuit having a switching semiconductor element,
wherein said drive circuit is configured to rotate said electric motor in forward and reverse directions by turning on and/or off said switching semiconductor element,
wherein said drive control circuit is configured to start and/or stop said electric motor by applying a PWM signal to the switching semiconductor element constructing a lower arm of said H bridge circuit,
wherein said drive control circuit is communicatedly connected to a radio, and
wherein said drive control circuit is configured to apply a driving pulse when said radio is turned on and is configured to apply the PWM signal when said radio is turned off.

9. The actuator driving control device according to claim 8, wherein a regenerative braking is applied to said electric motor by applying said PWM signal to the switching semiconductor element constructing said lower arm.

10. The actuator driving control device according to claim 8, wherein said drive control circuit is capable of selecting a first mode for applying the PWM signal, or a second mode for applying the driving pulse, to the switching semiconductor element constructing said lower arm.

11. The actuator driving control device according to claim 8, wherein said drive control circuit is configured to switch to the mode for applying the driving pulse when a targeted torque of the motor is not obtained even if the PWM signal is applied.

12. The actuator driving control device according to claim 8, wherein, when starting the electric motor, said drive control circuit is configured to apply the PWM signal to the switching semiconductor element constructing the lower arm of said H bridge circuit such that a duty ratio of the PWM signal increases based on a first predetermined rate.

13. The actuator driving control device according to claim 12, wherein, when stopping the electric motor, said drive control circuit is configured to apply the PWM signal to the switching semiconductor element constructing the lower arm of said H bridge circuit such that duty ratio of the PWM signal decreases based on a second predetermined rate.

14. The actuator driving control device according to claim 13, wherein the first and second predetermined rates are substantially equal.

15. The actuator driving control device according to claim 8, wherein the drive circuit is configured to drive the electric motor of the actuator for opening and closing an air conditioning door.

16. A driving control device for an actuator comprising:
a drive circuit configured to drive an electric motor of an actuator; and
a drive control circuit configured to control a rotation of said electric motor by controlling the drive circuit,
wherein said drive circuit includes an H bridge circuit having a switching semiconductor element,
wherein said drive circuit is configured to rotate said electric motor in forward and reverse directions by turning on and/or off said switching semiconductor element,
wherein said drive control circuit is configured to start and/or stop said electric motor by applying a PWM signal to the switching semiconductor element constructing a lower arm of said H bridge circuit,
wherein a duty ratio of the PWM signal varies based on a predetermined rate from a first value to a second value,
wherein said drive control circuit is capable of selecting a first mode for applying the PWM signal, or a second mode for applying a driving pulse, to the switching semiconductor element constructing said lower arm,
wherein said drive control circuit is communicatedly connected to a radio, and
wherein said drive control circuit is configured to apply the driving pulse when said radio is turned on and is configured to apply the PWM signal when said radio is turned off.

17. The actuator driving control device according to claim 16, wherein the drive circuit configured to drive the electric motor of the actuator for opening and closing an air conditioning door.

18. The actuator driving control device according to claim 16, wherein a regenerative braking is applied to said electric motor by applying said PWM signal to the switching semiconductor element constructing said lower arm.

19. The actuator driving control device according to claim 16, wherein said drive control circuit is configured to switch to the mode for applying the driving pulse when a targeted torque of the motor is not obtained even if the PWM signal is applied.

20. The actuator driving control device according to claim 16, wherein, when starting the electric motor, said drive control circuit is configured to apply the PWM signal to the switching semiconductor element constructing the lower arm of said H bridge circuit such that the duty ratio of the PWM signal increases based on the predetermined rate.

21. The actuator driving control device according to claim 20, wherein, when stopping the electric motor, said drive control circuit is configured to apply the PWM signal to the switching semiconductor element constructing the lower arm of said H bridge circuit such that duty ratio of the PWM signal decreases based on the predetermined rate.

* * * * *